United States Patent [19]

Spies

[11] 4,251,119

[45] Feb. 17, 1981

[54] GAS BEARING FOR RAPIDLY ROTATING PARTS

[75] Inventor: Alfons Spies, Munich, Fed. Rep. of Germany

[73] Assignee: Johannes Heidenhain GmbH, Traunreut, Fed. Rep. of Germany

[21] Appl. No.: 958,625

[22] Filed: Nov. 8, 1978

Related U.S. Application Data

[63] Continuation of Ser. No. 785,584, Apr. 4, 1977, abandoned.

[30] Foreign Application Priority Data

Apr. 13, 1976 [DE]  Fed. Rep. of Germany ....... 2616132

[51] Int. Cl.$^3$ .............................................. F16C 35/00
[52] U.S. Cl. .................................. 308/9; 308/DIG. 1; 308/122
[58] Field of Search ................. 308/DIG. 1, 9, 10, 15, 308/35, 73, 121, 122; 57/58.89, 92, 100, 104

[56] References Cited

U.S. PATENT DOCUMENTS

| | | | |
|---|---|---|---|
| 3,215,480 | 11/1965 | Marley | 308/DIG. 1 |
| 3,504,953 | 4/1970 | Lore | 308/121 |
| 3,506,314 | 4/1970 | Gross et al. | 308/9 |
| 3,793,820 | 2/1974 | Rajnoha | 57/58.89 |
| 3,838,560 | 10/1974 | Stahlecker | 57/58.89 |
| 4,043,612 | 8/1977 | Orcutt | 308/9 |

FOREIGN PATENT DOCUMENTS 2355769  5/1975  Fed. Rep. of Germany .......... 57/58.89
1375546  11/1974  United Kingdom .................... 57/58.89

OTHER PUBLICATIONS

GEC Journal of Science & Technology, vol. 42, No. 1, pp. 37-47, 1975, "Dynamic Characteristics of Bearings".

Primary Examiner—Charles E. Phillips
Attorney, Agent, or Firm—Hume, Clement, Brinks, Willian & Olds, Ltd.

[57] ABSTRACT

A gas bearing for rapidly rotating parts, particularly in textile machines, including two support members mounted on a base plate, thin foils attached to each of the support members by means of clamping plates such that the foils partially embrace a rotor shaft or other part to be positioned, and a drive belt which rotates the rotor shaft and maintains the shaft positioned against the foils. Additionally a movable hose is attached to a foil whereby gas can be introduced between the rotor shaft and the foil by means of perforations in the foil. A similar supporting gas film is created at an end of the rotor shaft. Centrally located axial passages in the rotor shaft and a positioning magnet introduce gas into the shaft and through radial ducts in the shaft to provide a thin gas film for supporting the shaft. According to a further embodiment a gas bearing is provided for use with a shaft which is driven independently of the bearing.

12 Claims, 7 Drawing Figures

GAS BEARING FOR RAPIDLY ROTATING PARTS

This is a continuation, of application Ser. No. 785,584, filed Apr. 4, 1977, now abandoned.

BACKGROUND OF THE INVENTION

The invention relates to a gas bearing for rapidly rotating parts in textile machines, and particularly to a gas bearing for the positioning of rotating parts such as spinning rotors, spinning rings, and spinning spindles in textile machines. In the prior art gas bearings utilizing thin foils as bearing elements are known, for example, as described in the book "Gas Film Lubrication" by W. A. Gross, at pages 138-141 (1962).

SUMMARY OF THE INVENTION

The present invention provides an improved gas bearing for rapidly rotating parts, as in textile machines, wherein the bearing has the advantages of high stability, operational safety, and minimal maintenance, along with competitive ease and feasibility of production and simplicity in mounting.

These advantages are achieved in a gas bearing embodiment of the invention which includes two support members mounted on a base plate, foils attached to each of the support members with enough slack to partially embrace a rotor shaft, and a drive belt which not only rotates the rotor shaft but also maintains the shaft positioned against the foils.

According to another embodiment of the invention there is provided a gas bearing which includes a base member, a foil mounted on the base member by means of clamping members, and a drive belt which is accomodated within a recess in the base member, foil, and clamping members. A movable plastic hose is also included and attached to the foil whereby air can be introduced between the rotor shaft and the foil by means of perforations in the foil. A similar supporting gas film is created at an end of the rotor shaft enclosed by the base member and positioned adjacent to a permanent magnet.

According to a further embodiment a gas bearing is provided for use with a shaft which is driven independently of the bearing. In this embodiment two foil bearing members are arranged on a base plate to support a rotor shaft without the use of a drive belt. Rotation of the shaft is accomplished by a commutated motor positioned such that the shaft is the armature of the motor. Centrally located axial passages in the rotor shaft and positioning magnet introduce gas into the shaft and through radial ducts in the shaft to provide a thin gas film for supporting the shaft.

DESCRIPTION OF THE PREFERRED EMBODIMENT

Figure 1:
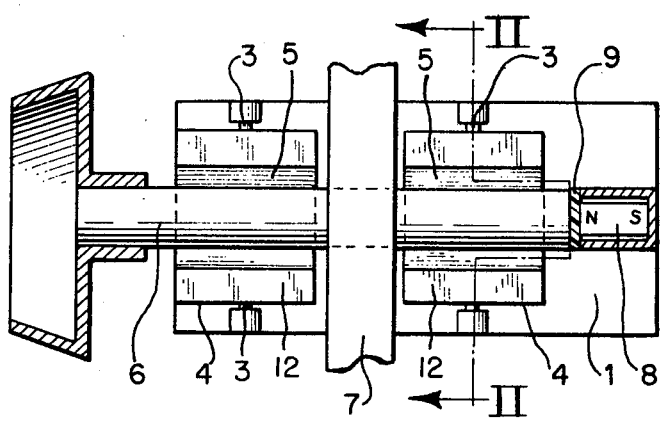
FIG. 1 is a longitudinal cross-sectional view of an embodiment of a spinning rotor bearing according to the present invention.
Figure 2:
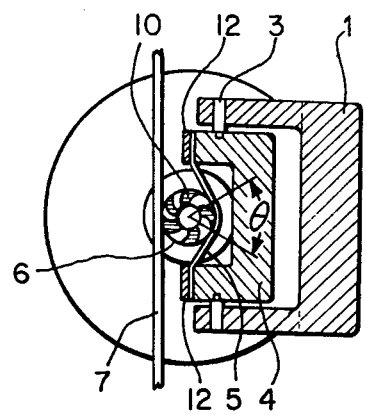
FIG. 2 is a lateral cross-sectional view of the spinning rotor bearing of FIG. 1 taken along line II—II.

Referring now to the drawings, and more particularly to FIGS. 1 and 2, there is illustrated an embodiment of the present invention which is particularly suited for the positioning of parts such as spinning rotors in open-end spinning machines. Two supporting members 4, rotatable on shafts 3, are mounted on a base plate 1. A flexible, thin foil 5 is clamped into each of the supporting members 4 by means of clamping plates 12. The foil 5 is made from a suitable metal or plastic. A rotor shaft 6 to be positioned or supported is inserted into the foils 5. The tensional length of the foils 5 is determined so that the foil 5 contacts the rotor shaft 6 within an angle of wrap $\theta$ thereby providing a bearing surface for the rotor shaft 6. A drive member, preferably a drive belt 7, maintains the rotor 6 against the bearing surface formed by the foils 5.

As movement of the drive belt 7 is commenced, the shaft 6 rotates because friction between rotor shaft 6 and belt 7 is greater than that between the rotor shaft 6 and the foils 5. As the revolutions per minute of the shaft 6 increase, a gas film is formed between the rotor shaft 6 and the foils 5, so that eventually at a sufficiently high number of revolutions per minute the rotor shaft 6 floats radially on a gas film.

A permanent magnet 8 coated with a thin layer 9 of suitable low friction synthetic material is located at an end of the rotor shaft 6. The permanent magnet 8 is mounted on the base plate 1 and is used for axial mounting of the rotor 6.

The end of the rotor shaft 6 adjacent the permanent magnet 8 has inwardly directed channels 10 of spiral groove-like design which pump gas inwardly as the rotor 6 spins. At higher numbers or revolutions per minute a gas film is formed between the end of the rotor shaft 6 adjacent the permanent magnet 8 and the layer 9 so that the rotor shaft 6 is also axially guided without friction.

Figure 3:
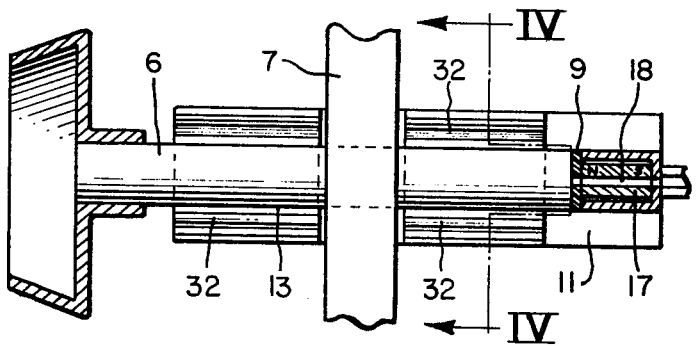
FIG. 3 is a longitudinal cross-sectional view of an additional embodiment of a spinning rotor bearing according to the present invention.
Figure 4:
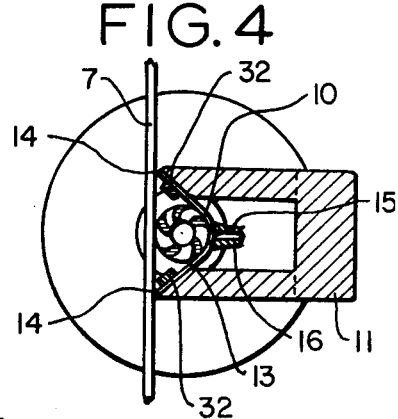
FIG. 4 is a lateral cross-sectional view of the spinning rotor bearing of FIG. 3 taken along line IV—IV.

Referring now to FIGS. 3 and 4 there is illustrated an additional embodiment of the present invention utilizing only foil 13 and so constructed as to allow feeding a suitable gas, such as compressed air, into the bearing during the initial rotation of the rotor shaft 6, thereby facilitating commencement of the rotation. A thin foil 13 is mounted by means of clamping members 32 on a base member 11. The foil 13 is cut precisely parallel at its sides and inserted into parallel ground stops 14 of the base member 11, so that a uniform curvature of the foil 13 is produced corresponding to the radius of curvature of the rotor shaft 6. The shaft 6 is inserted against the foil 13 bearing surface.

The base member 11, the foil 13 and the clamping members 32 are all provided with a recess, centrally located along their longitudinal dimensions, into which the drive belt 7 is inserted. As a result of the lateral contact pressure of the drive belt 7 the rotor 6 is maintained in the foil 13. The foil 13 is provided with fine perforations 15 at a plurality of locations. Compressed air can be introduced via a movable hose 16, made of a suitable plastic and attached to the foil 13, so that a gas film can be created between the rotor shaft 6 and the foil 13 by supplying compressed air to the hose 16. The compressed air may be disconnected after rotation of the rotor shaft 6 commences.

A permanent magnet 17 to which a thin synthetic layer 9 is pasted is located at one side of the rotor shaft 6. The permanent magnet 17 and the layer 9 are provided with a thin perforation 18 through which gas is supplied, so that a supporting gas film is created between the magnet 17 and an end of the rotor shaft 6.

Figure 5:
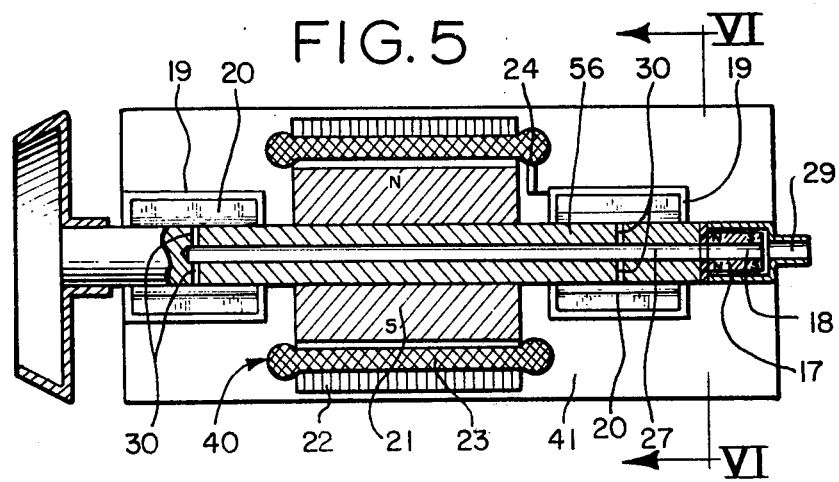
FIG. 5 is a longitudinal cross-sectional view of a spinning rotor bearing embodying the present invention, including a rotor shaft drive means independent from shaft supports.
Figure 6:
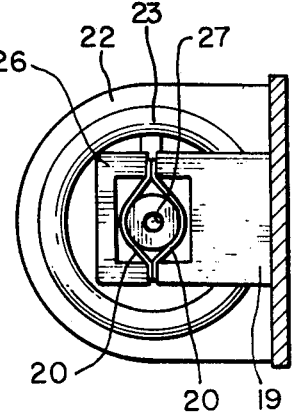
FIG. 6 is a lateral cross-sectional view of the spinning rotor bearing of FIG. 5 taken along line VI—VI.

In FIGS. 5 and 6 there is shown a bearing arrangement suitable for use with a separately driven shaft. Two bearing members 19 are arranged on a base 41 to support a rotor shaft 56. As illustrated in FIG. 6, two foils 20 are clamped into the bearing members 19 and embrace the rotor shaft 56 to be positioned. A suitable electrically commutated motor 40 is positioned between the bearing members 19. As known in the prior art the motor 40 includes a permanent magnet 21 seated on the shaft 56 to be driven. Magnetic flux is enclosed by a laminated soft magnetic ring 22 typically made from a ferrous material. A coil 23 is located in the air gap between the permanent magnet 21 and the ring 22. Commutation is accomplished by means of an electric circuit (not shown) and controlled by a Hall generator 24 in a well-known manner. Axial mounting of the rotor shaft 56 is accomplished in this embodiment with the permanent magnet 17 as in the embodiment depicted in FIG. 3.

Figure 7:
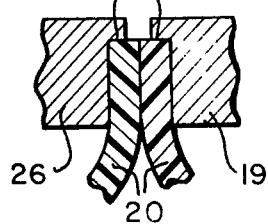
FIG. 7 is an enlarged view of a section of FIG. 6 illustrating the clamping arrangement of foils to a bearing member and a clamping part.

Clamping of the foils 20 according to the invention is illustrated in FIG. 7. The foils 20 which are associated with one bearing location are cut prior to mounting according to a pre-determined width and length and with parallel edges. During assembly of the bearing the foils are inserted into precisely ground ledges 25 of the bearing member 19 and of a clamping part 26, so that the foil 20 forms a uniform curvature with a radius of curvature corresponding to the diameter of the rotor shaft 56 to be positioned.

To achieve a relatively high rigidity of the positioning of the rotor shaft 6 the foils 20 are preferably pretensioned. However, this pretension increases the necessary starting torque, because the motor 40 must initially overcome the mechanical friction between the rotor shaft 56 and the foils 20, until a gas film has developed at higher numbers of revolutions per minute. Accordingly, it is preferable to conduct a suitable gas, such as compressed air, to the radial and axial bearing locations when rotation of the rotor shaft is commenced.

Therefore the rotor shaft 56 of the embodiment illustrated in FIG. 5 is provided with a central axial passage 27. The permanent magnet 17 is likewise provided with an axial bore 18 whereby compressed air can be supplied into the passage 27 via a hose 29. With the application of the air pressure a thin gas film is formed between the magnet 17 and the surface of the rotor shaft 56 located adjacent the magnet 17.

In the center of both bearing members 19 the rotor shaft 56 is provided with several fine, radial ducts 30, each of which are connected to the axial passage 27. Air discharged from the ducts 30 forms a thin gas film between the rotor shaft 56 and the foils 20, so that the rotor shaft 56 floats on air around its circumference.

The apparatus shown in FIG. 5 for the feeding of compressed air into the bearings may be advantageously applied in the embodiment of FIGS. 3 and 4. However, in the embodiment of FIGS. 3 and 4 not all channels 10 are covered by a foil 13 and, therefore, compressed air can discharge into the open air. However, this disadvantage is insignificant because compressed air is required only in the starting phase of operation of the rotating shaft.

The application of foil bearings for the positioning of rapidly rotating parts in textile machines has the advantage of considerably simplified fabrication and assembly in comparison with the gas bearings of stationary housings used in the prior art.

Though the embodiments hereinbefore described are preferred, many modifications and refinements which do not depart from the true spirit and scope of the invention may be conceived by those skilled in the art. For instance, the present invention can be used to position spinning rings, spinning spindles and other rotating parts of textile machines. Moreover, rotating parts in various other machines may be positioned by means of modified embodiments of the invention. It is intended that these and all such other modifications be covered by the following claims.

I claim:

1. A gas bearing including a foil bearing for a rotatable member in a textile machine comprising:
   a foil;
   means for fixedly supporting the foil, said support means including first and second fixedly mounted, spaced support surfaces configured to provide the foil with a predetermined curvature substantially corresponding to the radius of curvature of the rotatable member; and
   means for fixedly securing the foil to the first and second support surfaces such that the foil is made to conform to the support surfaces and to assume a predetermined curvature substantially corresponding to the radius of curvature of the rotatable member, even in the absence of contact with the rotatable member.

2. The gas bearing of claim 1 wherein all of the bearing surfaces of all of the foils of the gas bearing are positioned on the same side of the axis of rotation of the rotatable member.

3. The gas bearing of claim 1 wherein the foil is formed from a metal.

4. The gas bearing of claim 1 wherein the foil is formed from a plastic.

5. The gas bearing of claim 1 further including a spiral groove axial air bearing.

6. A gas bearing for a rotatable shaft in a textile machine comprising:
   a base;
   at least one foil having a bearing surface for a portion of the shaft and first and second end sections;
   means for fixedly mounting the first and second end sections of the foil to the base, said mounting means including first and second support surfaces configured to provide the bearing surface with a curvature substantially corresponding to the radius of curvature of the shaft;
   means for securing the first and second end sections of the foil to the first and second support surfaces, respectively, such that the end sections of the foil are made to conform to the support surfaces and to assume a predetermined rest position such that the curvature of the bearing surface substantially corresponds to the radius of curvature of the shaft, wherein all of the bearing surfaces of all the foils of the bearing are positioned on the same side of the axis of rotation of the shaft; and a drive member contacting the shaft to maintain the shaft adjacent the foil and to supply a driving force to rotate the shaft.

7. A gas bearing, including a foil bearing for a rotatable member, comprising:

a base;

first and second foil support members fixedly secured to the base;

first and second spaced foil support surfaces defined by the first and second foil support members, respectively, said first and second support surfaces configured to provide the foil with a curvature substantially corresponding to the curvature of the periphery of the rotatable member;

a foil extending between the first and second support surfaces; and means for securing the foil to the first and second support surfaces such that the foil conforms to the first and second support surfaces and assumes a predetermined curvature substantially corresponding to the curvature of the periphery of the rotatable member even in the absence of contact with the rotatable member.

8. The gas bearing of claim 7 wherein the first and second support surfaces are substantially parallel.

9. The gas bearing of claim 7 wherein the curvature assumed by the foil is substantially uniform over a predetermined portion of the foil centered between the first and second support surfaces.

10. A gas bearing, including a foil bearing for a rotatable member, comprising:

a base;

first and second foil support members fixedly secured to the base;

first and second spaced foil support surfaces defined by the first and second foil support members, respectfully, said first and second support surfaces configured to provide the foil with a curvature substantially corresponding to the curvature of the periphery of the rotatable member;

a foil extending between the first and second support surfaces; and means for securing the foil to the first and second support surfaces such that the foil conforms to the support surfaces and assumes a predetermined position, even in the absence of contact with the rotatable member, in which the curvature of the foil is substantially uniform over a predetermined central portion of the foil and wherein said substantially uniform foil curvature substantially corresponds to the curvature of the periphery of the rotatable member.

11. In a gas bearing for a rotatable member in a textile machine, the improvement comprising:

a base;

first and second spaced support members fixedly attached to the base;

first and second spaced, parallel foil support surfaces defined by the first and second support members, respectively, said first and second support surfaces being angled with respect to one another and configured to provide the foil with a curvature substantially corresponding curvature of the periphery of the rotatable member;

a foil extending between the first and second support surfaces; and means for fixedly securing the foil to the first and second support surfaces such that the foil conforms to the first and second support surfaces and assumes a rest position which defines a curvature substantially corresponding to the curvature of the periphery of the rotatable member, even in the absence of contact with the rotatable member, and the foil is thereby configured to receive the rotatable member without substantial reconfiguration of the foil.

12. The gas bearing of claims 7 or 10 or 11 wherein the foil defines a bearing surface for supporting the rotatable member and the bearing surfaces of all the foils of the gas bearing are positioned on the same side of the axis of rotation of the rotatable member.

* * * * *